Patented Aug. 30, 1949

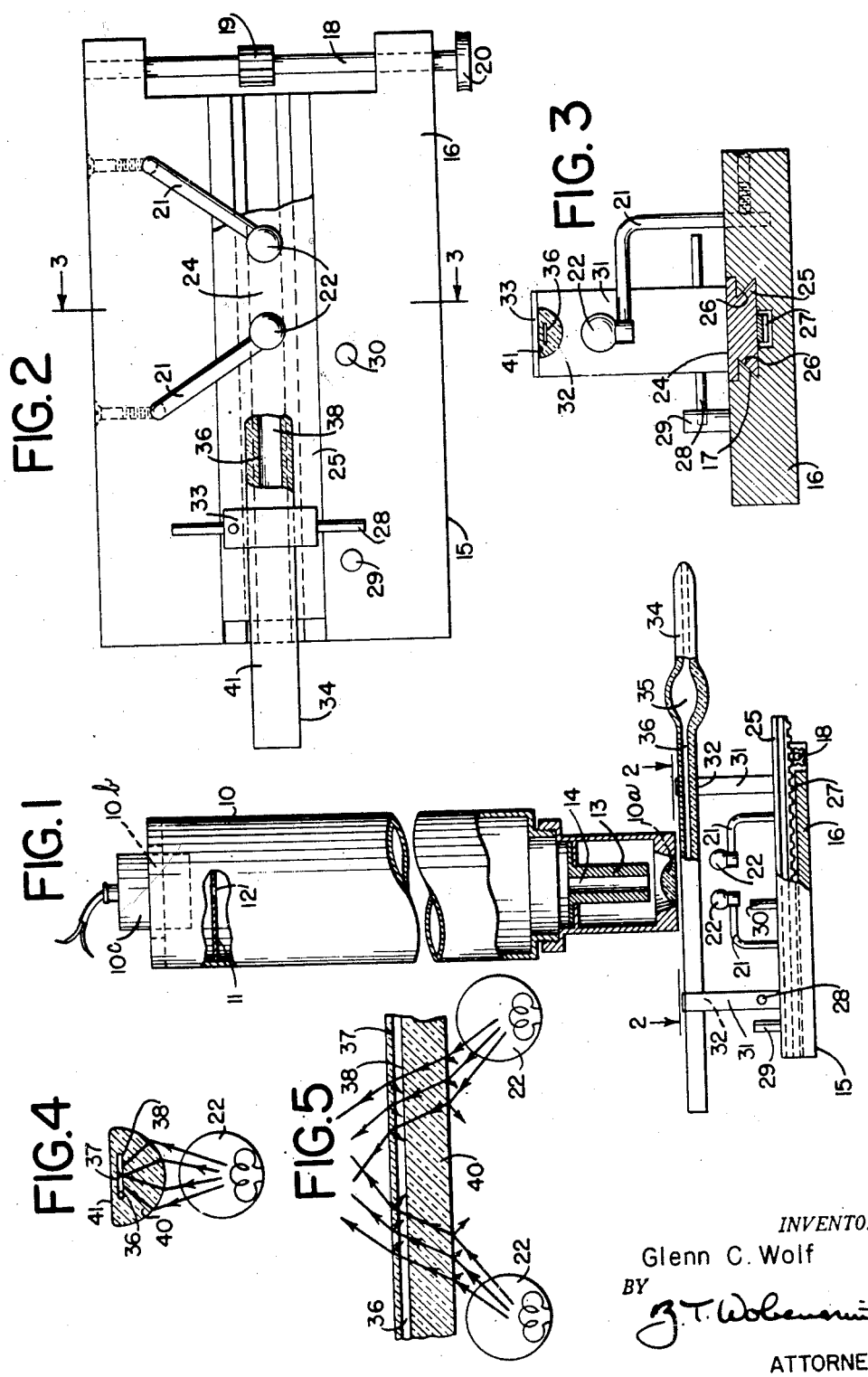

2,480,312

UNITED STATES PATENT OFFICE 2,480,312

APPARATUS FOR THE OBSERVATION AND COUNTING OF MICROSCOPIC BODIES

Glenn C. Wolf, Mattoon, Ill.

Application February 20, 1947, Serial No. 729,725

6 Claims. (Cl. 88—40)

This invention relates to apparatus for the counting of microscopic bodies, such as blood cells, bacteria, insoluble crystals and other small particles in a clear suspending liquid medium, which is compatible with the minute objects to be counted.

It is the principal object of the present invention to provide suitable apparatus for handling liquid media containing minute particles to be counted and for effecting relative motion of the particles and a field of vision, so that the particles may be counted as they and the field of vision are brought into alinement.

It is a further object of the present invention to provide apparatus for observing and counting particles of microscopic size suspended in a fluid medium having an improved counting space or chamber.

It is a further object of the present invention to provide apparatus for observing and counting particles of microscopic size having improved provisions for illuminating the objects to be counted.

It is a further object of the present invention to provide apparatus for observing and counting particles of microscopic size suspended in a fluid medium having an improved counting space or chamber in which a portion of the wall of the chamber serves as a cylindrical condenser to produce the desired illumination.

It is a further object of the present invention to provide apparatus for observing small particles in which the particles are illuminated in an improved manner, the light being so directed that none of the direct light enters the microscope.

Other objects and advantageous features of the invention will be apparent from the specification and claims.

The nature and characteristic features of the invention will be more readily understood from the following description, taken in connection with the accompanying drawings forming part hereof, in which:

Figure 1 is a front elevational view of apparatus in accordance with the present invention, parts being broken away to show the internal details;

Fig. 2 is an enlarged horizontal sectional view taken approximately on the line 2—2 of Fig. 1, parts being broken away to show the details of construction;

Fig. 3 is a transverse sectional view taken approximately on the line 3—3 of Fig. 2;

Fig. 4 is a transverse sectional view, greatly enlarged, of a transparent tube used in connection with the invention; and Fig. 5 is a longitudinal sectional view of the tube illustrated in Fig. 4 showing the nature of illumination of the contents of the tube.

It should, of course, be understood that the description and drawings herein are illustrative merely, and that various modifications and changes may be made in the structure disclosed without departing from the spirit of the invention.

Referring more particularly to the drawings, a microscope tube 10 is provided having an optical system therein of the desired magnification or range of magnification. Within the microscope tube 10 there is provided in the customary manner an objective 10a at the lower end and an eye piece 10b at the upper end for ordinary visual observation. If desired, a photo-cell 10c may also be mounted above or in place of the eye piece 10b for electronically counting the microscopic bodies. At the upper end of the body of the microscope 10, a disc or plate 11 having a slit aperture 12 is provided, for limiting the field of vision, as hereinafter explained, and at the lower end, a dark field funnel stop 13 having a central vertical aperture 14 is provided to prevent the undesired entrance of light into the optical system of the microscope 10.

A stage 15 is provided, of any preferred construction, and is adapted to be supported in any desired manner with respect to the lower end of the microscope body 10 in which the microscope objective 10a is mounted. The stage 15 preferably includes a fixedly mounted rectangular base plate 16 which is preferably rigidly secured to the frame (not shown) on which the microscope tube 10 is mounted. The base plate 16 preferably has a longitudinally extending dovetail recess or slot 17 therein. The base plate 16 has mounted therein a shaft 18 with a central pinion 19 secured thereto in alinement with the slot 17, and with an exteriorly disposed actuating handle 20 for effecting rotation of the shaft 18. The base plate 16 is provided with adjustable light supports 21 each having at its upper and free end an incandescent bulb 22 which is adapted to be positioned as hereinafter explained.

A movable carriage 25 is provided having side walls 26 complemental to the recess or slot 17 in the base plate 16, and on the underside of the carriage 25, a rack 27 is provided for engagement with the pinion 19, so that the carriage 25 may be moved longitudinally as hereinafter explained. The upper face of the base plate 16 and the upper face 24 of the carriage 25 are preferably blackened to prevent the reflection of light therefrom.

The carriage 25 is preferably provided with an outwardly extending abutment 28 for limiting the longitudinal movement of the carriage 25, as determined by the positioning of posts 29 and 30, spaced a predetermined longitudinal distance apart on the base plate 16.

The carriage 25 is provided with a pair of spaced upwardly extending supports 31 having notches 32 at the upper ends thereof for the mounting and clamping, by means of suitable clamping arms 33, of a pipette 34.

The pipette 34 is preferably formed from glass tubing, may have an enlarged chamber 35 near one end thereof, and within the interior of the pipette 34, a central longitudinally extending passageway or opening 36 is provided, preferably of flattened cross section, so that the width of the passageway 36 is at least several times the distance between the upper and lower interior surfaces 37 and 38. This latter distance is preferably not in substantial excess of the maximum dimension of the minute or microscopic bodies to be counted, so that a single layer of cells carried in a suspending liquid medium will be available for observation in the passageway 36.

The body 40 of the pipette 34, below the central opening 36, is cylindrical and preferably of semi-circular transverse cross section (see Fig. 4), and, spaced above the central opening 36 the body of the pipette 34 has a flat surface portion 41. The distance between the upper interior wall surface 37 of the central opening 36, and the flat external surface 41 is preferably small, so that the lower interior surface 38 of the central opening 36 may be disposed adjacent the objective 10a and within the focal distance thereof.

The operation and manner of use of the apparatus in accordance with the present invention will now be pointed out.

The pipette 34 is supplied with liquid containing the small particles to be counted, and the liquid is directed so as to fill a substantial length of the interior longitudinal opening 36. The pipette 34 is then positioned in the notches 32 of the supports 31 and the clamping arms 33 moved to hold the pipette 34 clamped in the supports 31.

The incandescent bulbs 22 are illuminated and are positioned so that the bulbs 22 are disposed at spaced locations along the longitudinal axis of the pipette 34 and below the curved lower surface of the pipette 34. The bulbs 22 are adjustable as to their positioning to permit shifting to obtain the best illumination of the minute particles at an oblique angle. In the positioning, the incandescent bulbs 22 will, of course, be out of the focus of the objective 10a of the microscope.

The path or course of the light is indicated diagrammatically in Figs. 4 and 5. It will be noted that rays of light from the sources at the incandescent bulbs 22 pass upwardly to the lower surface of the body of the pipette 34 which functions as a cylindrical condenser, and are bent and directed toward and across the central opening or passageway 36. The light adjacent the objective 10a is at an oblique angle with respect thereto, so that the microscopic particles are illuminated, but the direct entry of light into the optical system, including the objective 10a, is avoided.

The carriage 25, with the pipette 34 carried thereby may then be moved longitudinally by manual rotation of the actuating handle 20, the engagement of the pinion 19 in the rack 27 effecting longitudinal movement of the carriage 25. The movement of the carriage 25 is limited by the engagement of the abutment 28 with the stop posts 29 and 30.

A predetermined length of the longitudinal central opening 36 may thus be moved past the objective 10a of the microscope. For a particular cross-sectional area of the central opening 36, movement of a predetermined length of the pipette 34 past the objective 10a will permit of the observation of a predetermined sample of known or fixed volume. The use of the slit aperture 12 will limit the area available for observation at any particular location as the pipette 34 is advanced with respect to the objective 10a of the microscope.

As the pipette 34 is advanced, successive portions thereof will be presented for observation at the objective 10a, for visual observation through the eye piece 10b or, if desired, for counting by the photo-cell 10c. If desired, for visual observation, the disc or plate 11 may be removed so that a larger portion of the length of the pipette 34 will be available for observation of the contents.

I claim:

1. Apparatus for the observation of microscopic bodies including magnifying means having an objective with a dark field stop, a base member fixedly mounted with respect to said magnifying means, a carriage mounted for predetermined linear movement with respect to said base member, an elongated tubular body of transparent material carried by said carriage for linear movement therewith, said tubular body having a longitudinal passageway transversely disposed with respect to and within focus of the objective for the reception of microscopic bodies in a suspending liquid medium, said tubular body having a longitudinally disposed light condensing portion extending therealong, and means for illuminating the bodies in said passageway comprising a light source spaced below said light condensing portion and offset along said light condensing portion beyond the range of the optical aperture of the magnifying means, said light condensing portion being disposed between said light source and said passageway.

2. Apparatus for the observation of microscopic bodies including magnifying means having an objective with a dark field stop, a carriage movably mounted with respect to said magnifying means for linear movement laterally with respect to the optical axis of the magnifying means, means for limiting the extent of linear movement of said carriage, an elongated tubular body of transparent material carried by said carriage for linear movement therewith, said tubular body having a longitudinal passageway transversely disposed with respect to and within focus of the objective for the reception of microscopic bodies in a suspending liquid medium, said tubular body having a longitudinally disposed light condensing portion extending therealong, and means for illuminating the bodies in said passageway comprising a plurality of light sources longitudinally spaced along said light condensing portion and offset along said light condensng portion beyond the range of the optical aperture of said magnifying means, said light condensing portion being disposed between said light sources and said passageway.

3. Apparatus for the observation of microscopic bodies including magnifying means in a lens tube with a dark field stop, a photo-electric counter in said tube in optical alinement with the optical axis of said magnifying means, a slit aperture disposed between said counter and said magnifying means, an elongated tubular body of transparent material transversely disposed with respect to the optical axis of said magnifying means, mounting means for said tubular body for linear movement of said body transverse to the optical axis through a predetermined distance, said tubular body having a flat elongated axially alined passageway for the reception of microscopic bodies in a suspending liquid medium and a longitudinally disposed light condensing portion extending therealong, means for illuminating the bodies in said passageway comprising at least one light source below said light condensing portion and offset along said light condensing portion beyond the range of the optical aperture of said magnifying means, said light condensing portion being disposed between said illuminating means and said passageway whereby constant light condensation is effected upon linear movement of said body, and said slit aperture restricting the range of view of said passageway exposed to said counter.

4. Apparatus for the observation of microscopic bodies including magnifying means having an objective with a dark field stop, an elongated tubular body of transparent material having a longitudinal passageway transversely disposed with respect to and within focus of the objective for the reception of microscopic bodies in a suspending liquid medium, said tubular body having a longitudinally disposed light condensing portion extending therealong, and means for illuminating the bodies in said passageway comprising a light source longitudinally spaced along said light condensing portion and offset along said light condensing portion beyond the range of the optical aperture of said magnifying means, said light condensing portion being disposed between said light source and said passageway, and means for effecting relative movement of the liquid suspending medium in said bore with respect to the objective.

5. In apparatus for the observation of microscopic bodies in a liquid medium with magnifying means having an objectice with a dark field stop for observation of the bodies in a test sample holder from one side thereof and with illuminating means disposed on the other side of the holder therealong and beyond the range of the optical aperture of the magnifying means comprising a test sample holder having an integral tubular body of transparent material with an interior longitudinal passageway, the passageway having spaced opposed interior faces, the body of one side of the longitudinal passageway having a flat exterior longitudinal surface parallel to said interior faces, and on the other side of the passageway being longitudinally semi-cylindrical.

6. In apparatus for the observation of microscopic bodies in a liquid medium with magnifying means having an objective with a dark field stop for observation of the bodies in a test sample holder from one side thereof and with illuminating means disposed on the other side of the holder therealong and beyond the range of the optical aperture of the magnifying means comprising a test sample holder having an integral tubular body of transparent material with an internal longitudinal bore having a dimension of the order of the maximum dimension of the microscopic bodies, the body on one side of the longitudinal bore having a flat exterior longitudinal surface parallel to said bore, and the body on the other side of the holder being longitudinally semi-cylindrical.

GLENN C. WOLF.

REFERENCES CITED

The following references are of record in the file of this patent:

UNITED STATES PATENTS

| Number | Name | Date |
| --- | --- | --- |
| Re. 10,189 | Peroni | Aug. 29, 1882 |
| 1,844,055 | Boyce | Feb. 9, 1932 |
| 2,206,214 | Wicker | July 2, 1940 |
| 2,415,480 | Gassert | Feb. 11, 1947 |

FOREIGN PATENTS

| Number | Country | Date |
| --- | --- | --- |
| 19,199 | Great Britain | Nov. 25, 1890 |

OTHER REFERENCES

Bausch & Lomb, Cat. #D-122 "Dark Field Optical Systems" pages 5-9. Publ. by Bausch & Lomb Optical Co., Rochester, New York.

American Optical Co. publication Vision, Article "Blood Will Tell." Volume 27, No. 4, Dec. 1943, page 16, published by American Optical Co., Southbridge, Mass.